Figure 1:
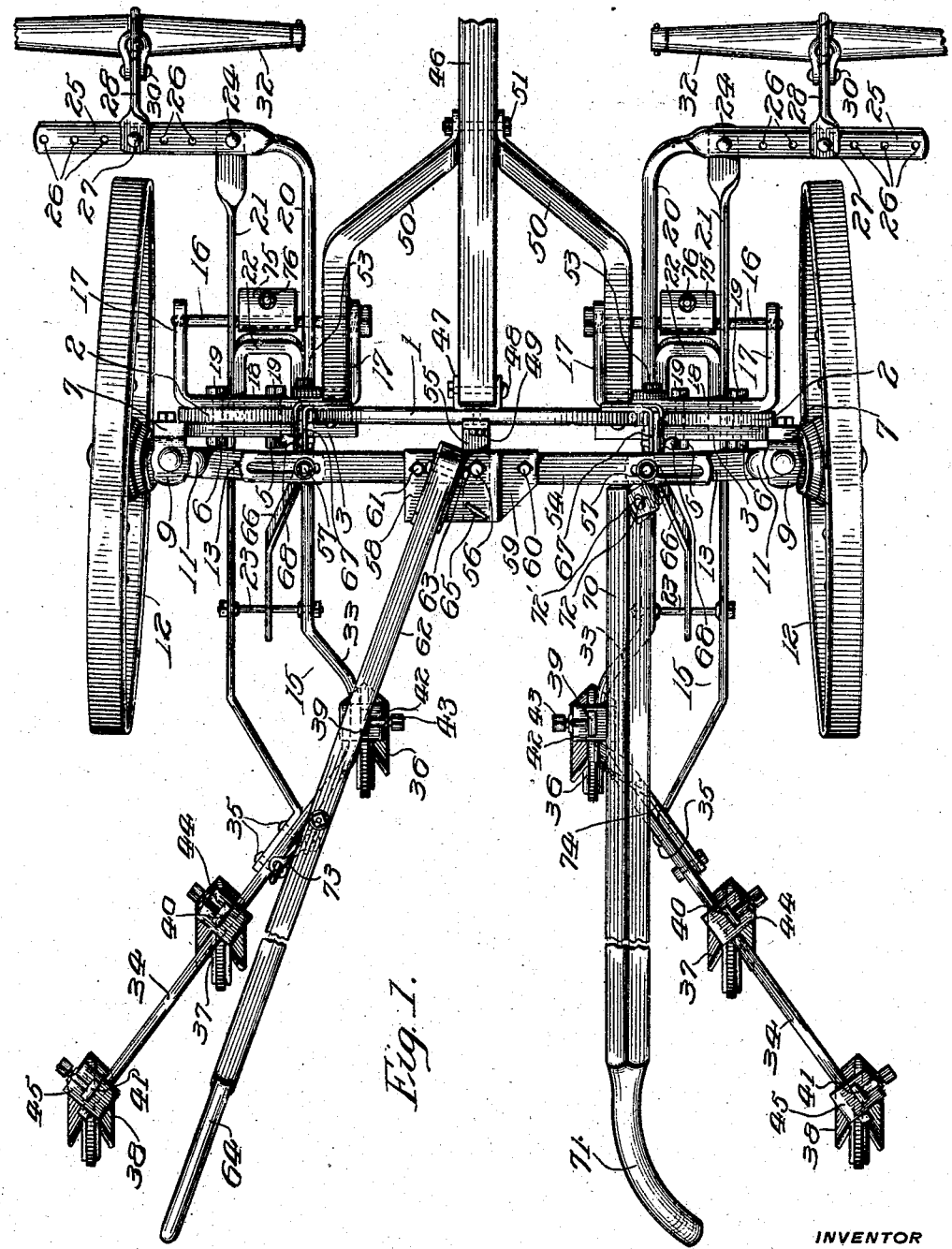

S. L. ALLEN.
CULTIVATOR.
APPLICATION FILED DEC. 23, 1907.

907,945.

Patented Dec. 29, 1908.
3 SHEETS—SHEET 1.

WITNESSES

INVENTOR
Samuel L. Allen.
BY
ATTORNEY

S. L. ALLEN.
CULTIVATOR.
APPLICATION FILED DEC. 23, 1907.
907,945.
Patented Dec. 29, 1908.
3 SHEETS—SHEET 2.
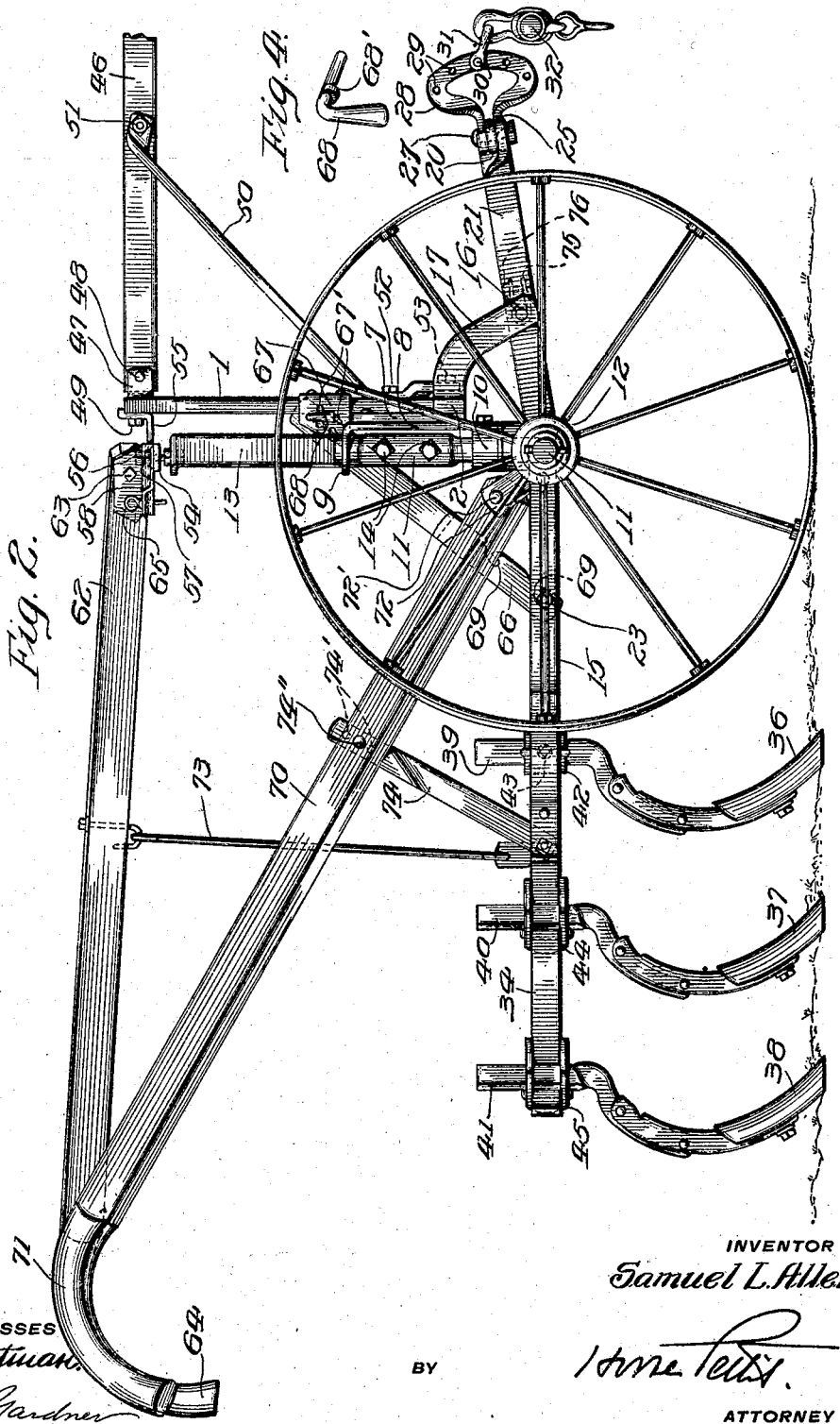
INVENTOR
Samuel L. Allen.
WITNESSES
BY
ATTORNEY

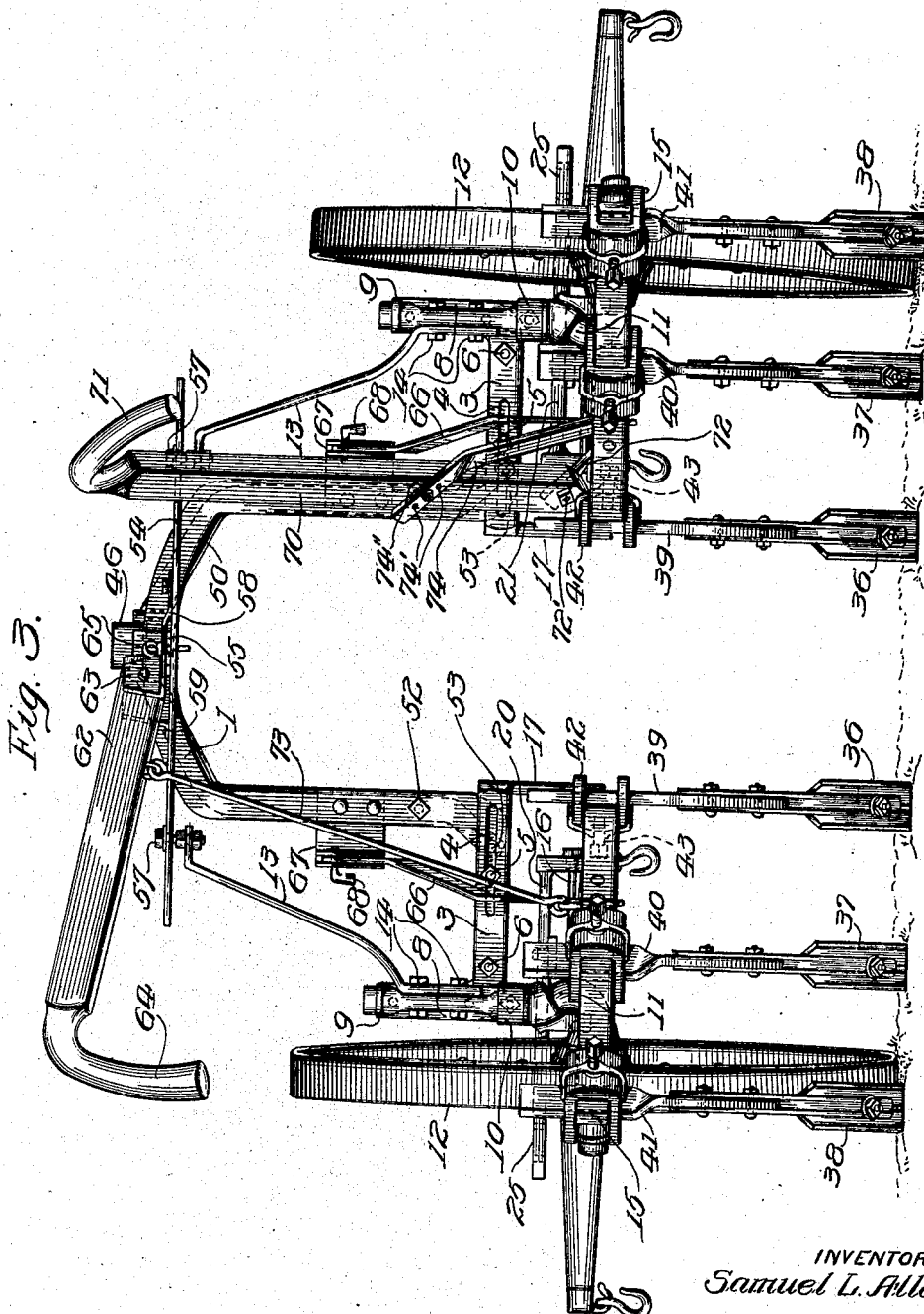

UNITED STATES PATENT OFFICE.

SAMUEL L. ALLEN, OF MOORESTOWN, NEW JERSEY.

CULTIVATOR.

No. 907,945.    Specification of Letters Patent.    Patented Dec. 29, 1908.

Application filed December 23, 1907. Serial No. 407,729.

*To all whom it may concern:*

Be it known that I, SAMUEL L. ALLEN, a citizen of the United States, and a resident of Moorestown, county of Burlington, State of New Jersey, have invented certain new and useful Improvements in Cultivators, of which the following is a full, clear, and exact description, reference being had to the accompanying drawings, forming a part of this specification.

The main object of my invention, broadly stated, is to provide an improved two-horse walking pivot wheel cultivator, adapted for the general and thorough working of all cultivated crops and for a large variety of work. More specifically stated, the object of my invention is to provide in a cultivator an improved main frame of simple, strong and durable construction; an improved tool carrying frame and mountings for the tools; improved means for steering the cultivator; improved means for the vertical adjustment of the tools; improved means for regulating the depth of penetration of the tools in the soil; improved means for the attachment of draft animals; and other improvements to be set forth in the following description and claims.

In the accompanying drawings, Figure 1 is a top plan view of a cultivator constructed in accordance with this invention; Fig. 2 a side elevation; Fig. 3 a rear elevation of the same; and Fig. 4 a perspective view of a detail of the same.

Referring to the drawings, the cultivator comprises a main frame having a central upwardly extending arch member 1, in the form of an inverted U, the lower ends 2 of which are extended laterally and outwardly to form supports for the wheels and other parts of the cultivator, as will be hereinafter described. Upon the rear face of each of said lateral extensions is secured a bar 3, provided upon its inner end with a longitudinal slot 4. This bar is adjustably secured to the lateral extension of the frame by means of a bolt 5 passing through the said slot and into the said extension, and a bolt 6 passing through an aperture in the bar provided therefor near its outer end and also into the lateral extension. The outer end of this bar 3 is extended upwardly to form a substantially vertical support 7, to which is bolted a vertical plate 8, which is extended rearwardly at its upper end 9, which is provided with an aperture and is provided at its lower end with a sleeve 10, forming upper and lower bearings for the vertical portion of the substantially L-shaped axle 11 carrying the wheel 12. The vertical portion of the axle is flattened between its bearings and is provided with an upwardly and inwardly extending crank arm 13, which is rigidly secured to the flattened portion of the axle by means of the bolts 14.

A tool carrying frame 15 is pivotally supported beneath each side of the main frame upon a bolt 16, which is supported in the ends of a downwardly extending yoke 17, the inner and upper side 18 of which is secured by means of a bolt 19 to the front face of the said lateral extension 2 of the arch member of the main frame. The bolt 16 is threaded at its end and also adjacent its head, and the latter threaded portion is made of larger diameter than the shank of the bolt, the ends of the yoke being threaded accordingly to receive the bolt. This frame 15 is composed of inner and outer parallel bars 20 and 21 respectively, which are provided with suitable apertures to receive the pivotal bolt 16. These parallel bars are secured together by means of the U-shaped brace 22 and brace rod 23. The forward end of the inner bar 20 is turned outwardly substantially at right angles to itself, and overlaps the forward end of the inner bar, to which it is rigidly secured by means of a rivet or bolt 24, the outer end 25 of the bar 20 being provided with holes 26 for the reception of a bolt 27 adjustably securing a vertical clevis 28 to the tool frame. The clevis 28 is provided with vertically spaced holes 29, to receive the bolt 30 of a vertically adjustable clevis 31, carrying the swingle-tree 32 for the attachment of a draft animal.

The rear portion of the frame 15 is arranged for the attachment of tools, the inner bar 20 of the frame being turned inwardly and rearwardly from a point adjacent and in the rear of the said cross brace 23, forming a short substantially oblique portion 33, and is then turned rearwardly and then outwardly, terminating in an oblique portion 34. The rear end of the outer bar 21 of the tool frame is shorter than the rear end of the inner bar, and is turned inwardly to meet the inner bar to which it is rigidly secured by means of rivets 35 or other fastening devices. The inner bar 20 of the frame is heavier than the outer bar in order to form a substantial support for the tools, and to resist the bending stresses due to the traction means.

Tools of various shapes may be attached to the tool carrying frame by any well-known means, but I have preferably shown three tools, 36, 37 and 38, attached thereto. These tools are rigidly secured to flattened vertical shanks or standards 39, 40 and 41 respectively. The foremost of these tools, 36, is longitudinally in alinement with the plane of its standard, and is attached to the portion of the bar 22, between the oblique portions 33 and 34 thereof, by means of a clamp member 42 having a set screw 43. This clamp is adapted to be slid when its set screw is loosened, along the bar to which it is attached, and may be secured either to the oblique portion 33 or to the oblique portion 34 of the bar, and when in either of the latter positions the tool would extend in a direction either obliquely inwardly or obliquely outwardly of the cultivator.

The tools 37 and 38 are preferably mounted upon standards 40 and 41 oblique thereto, in order to hold the tool longitudinally in alinement with the cultivator, being secured to the rear portion 34 of the bar by means of clamps 44 and 45.

Although I have shown the tool frame fitted with cultivator teeth, yet for some purposes plows, shovels, plant guards or other forms of tools may preferably be substituted for some or all of the cultivator teeth herein shown, and I do not wish to be limited to any particular form of tool or to any particular method of attachment to the tool carrying frame.

A traction tongue 46 is secured at its rear end to the top portion of the arch member 1 of the main frame in a clevis 47 having a bolt 48 extending through the tongue, the rear side of the clevis being rigidly secured to the arch member by means of a bolt 49. The tongue is also provided with oblique braces 50 extending from the opposite sides of the arch member 1 inwardly and forwardly to meet the tongue, to which they are secured by means of bolts 51. The lower portions of the braces are secured to the arch member by means of bolts 52, and the lower ends of the braces are turned forward and obliquely downward and outward, and terminate over the front sides of the yokes 17 which carry the tool frames, being secured thereto by means of bolts 53. The ends of the braces thus furnish an oblique stiffening means between the arch member and its lateral extensions, thus tending to stiffen the whole main frame of the cultivator.

The means for steering the cultivator comprises a steering bar 54 extending transversely of the cultivator in the rear of the upper portion of the arch member 1, and pivotally secured to the under side of a bracket 55 by means of a bolt 56, the bracket 55 being rigidly fastened to the rear side of the upper portion of the arch member by means of the said bolt 49, which also secures the yoke holding the rear end of the tongue. The outer ends of the steering bar 54 are slotted and are slidingly connected to the free ends of the said crank arms 13 of the axles by means of the bolts 57 which pass through the said slots, and are rigidly connected to the said crank arms.

For the purpose of attaching a handle bar, the said steering bar 54 is provided upon its upper side with plates 58 and 59, rigidly attached thereto by means of bolts 60 and 61. The inner portion of the plate 58 is raised above the plane of its outer surface, to pass over the upper surface of the bracket 55, and to permit of the swinging movement of the steering arm upon the bolt 56, which passes through the plate 58. The inner adjacent portions of the plates 58 and 59 are turned upwardly in parallel planes oblique to the steering bar, to form a housing for the inner end of the handle bar 62, which is pivoted to swing in a vertical plane upon the bolt 63 passing through the upturned portions of the said plate, the handle bar being held rigid laterally with respect to the said plates and steering bar. The outer end of the handle bar 62 is provided with a handle 64. With this construction in mind, it is obvious that when the handle bar is moved laterally, the steering bar will be swung upon its pivot, to act upon the crank arms of the axles to swing the wheels and thus steer the cultivator.

For the purpose of locking the steering mechanism to keep the wheels in a fixed position, as is often desirable, apertures are provided in alinement in the outer end of the bracket 55 and in the plate 58, and a pin 65 is provided to pass through said apertures and to hold the steering bar in a fixed position.

The vertical adjustment of the tool carrying frames is accomplished by means of notched pawl bars or gravity catches 66, which extend between the downwardly extending side portions of the arch member 1 of the main frame and the brace bars 23 of the tool carrying frames. The upper ends of the pawl bars are provided with a series of apertures and the arch member is provided with bifurcated brackets 67, provided with corresponding apertures 67', and pins 68 adapted to fit in said apertures to hold the upper ends of the pawl bars adjustably in position. The apertures 67' in one side of the bracket are in the shape of key holes and the pins 68, one of which is shown in perspective in Fig. 4 of the drawing, are each provided with a projection preferably in the form of an eccentric collar 68' adjacent the outer end thereof whereby the pins are locked in position. The lower ends of the pawl bars are preferably each provided with one or more notches 69, adapted to fit over the brace bars 23 of the tool carrying frames.

By this construction the pawl bars are held in engagement with the brace bars by gravity only.

Fine adjustments vertically of the tool frames are accomplished by means of the adjustment of the upper ends of the pawl bars, while the movement of the tool frames from an operative to an inoperative position is accomplished by means of the notches provided at the lower ends of the pawl bars. It will be seen that this arrangement allows the tongue to adjust itself to all heights of team or neck yoke, and at the same time relieves the team from weight upon their necks because the pawls do not hold the tool frames from moving upwardly.

The adjustment of the tool frames from one notch to an adjoining notch of the pawl bar is accomplished through the vertical movement of the handle bar 62 or of a handle bar 70 having a handle 71 at its outer end, the inner end of the handle bar 70 being connected rigidly to the corresponding tool frame by means of an oblique bracket 72 and an oblique bolt 72'. The handle bar 70 is preferably arranged longitudinally and obliquely so that the handle 71 will be within easy reach of the operator who walks to the left of the row, and the construction is such that the handle 71 will swing inwardly as it is swung upwardly.

The two handle bars are connected to their respective tool frames by means of the tie rods 73 and 74 respectively, so that as the handles are lifted the rear ends of the tool frames are raised accordingly. The ends of the tie rod 73 are provided with eyes which pass through staples or eye bolts. The upper end of the bar 74 is provided with apertures 74' and is adjustably connected to its handle bar 70 by means of a bolt 74" adapted to fit through said apertures, and the lower end of the bar 74 is fastened to its tool frame by a bolt. The bar 74 is substantially rigid longitudinally but slightly flexible laterally to permit of the oblique movement of the handle bar 70, as heretofore set forth. The upper edges of the notches in the pawl bars curve forwardly and upwardly with respect to the bar from the lower portions of the notches, whereby when the tool frames are raised suddenly the bars 23 of the frames resting in the notches act to throw the pawl bars upwardly and away from the said bars 23, and by a quick lowering of the handles after being suddenly raised the tool frames may be dropped from engagement with the upper notches to engagement with the lower notches.

When the cultivator is being turned at the headlands, or is being taken from field to field, the tool frames are raised and held stationary by the upper notches, the frames being dropped freely and easily into working position again, when desired, to hold the tools to the exact depth wanted; or the frames may be left "floating", that is to say, working the ground without engagement with the notches. The depth at which they float being regulated by the position of the draft clevis upon the vertical clevis situated on the draft bar.

The lateral adjustment of the wheels is quickly accomplished to accommodate the cultivator to rows spaced at various widths, by sliding the bars 3 outwardly or inwardly over the bolts through the slots therein, the outer bolts being removed when the bars are moved outwardly and being reinserted in the outer ends of the slots when the bar is in its extreme outward position, the inner bolts then being in the inner ends of the slots.

The lateral adjustment of the cultivating frames is accomplished by sliding the frames laterally upon the said bolts 16 to which they are pivoted, the frames being narrower than the clevis from which they depend to permit of this movement. An adjustable collar or split sleeve 75 is secured by means of the clamp screw 76 upon each bolt 16 between the sides of the tool carrying frame to hold the gangs at any desired distance one from the other.

The draft bars are so arranged that the horses walk exactly where they should walk, directly in front of the wheels. They are also so arranged that when an uneven team is used to draw the cultivator, the swingle-tree of the weaker animal may be placed further from the center of the cultivator than that of the stronger animal, to equalize the draft. This does away with an evener, or a double-tree and provides advantages over the evener. It is also to be noted that the draft of the animals is transmitted directly to the frame carrying the cultivating tools and is substantially in alinement with the tool upon each side of the cultivator.

The depth of the working is easily and accurately governed by the notched pawls which are readily adjusted as desired, while the draft is regulated quickly for greater or less penetration by means of the clevises which extend above and below the draft bars. By attaching the swingle-trees to the lower portions of their clevises, the tools will be drawn into the ground and will work the hardest kind of soil, while with the swingle-tree in the upper portions of the clevises the draft is sufficient for lighter soils or shallower work.

Where the character of the soil varies greatly in the same field or row, the swingle-trees should be attached to the lower portions of the clevises and the pawls should be used to limit the depth of penetration of the tools and thus secure a uniform depth of working.

The extension of the gang frame beyond the bolt upon which it swings, enables the draft bar to be placed directly in front of the wheel and at the same time makes the use of the tool with floating gangs quite easy and adjustments for depth more satisfactory.

Although I have shown only the preferred form in which this invention may be embodied, yet it is obvious that many changes might be made in the construction herein disclosed within the scope of the appended claims, without departing from the spirit of this invention or sacrificing any of the advantages thereof.

Having thus fully described my invention, what I claim and desire to protect by Letters Patent of the United States is:

1. In a cultivator, the combination with a main frame, of a tool carrying frame pivoted thereto, and a notched bar connecting said main frame and said tool carrying frame and holding said tool carrying frame in a predetermined position, said tool carrying frame being free to move upwardly into said position.

2. In a cultivator, the combination with a main frame, of a tool carrying frame pivoted thereto, a handle bar, means connecting said frames, detachably connected to one of said frames and held in engagement therewith by gravity only and thrown into or out of engagement therewith by the movement of said handle bar.

3. In a cultivator, the combination with a main frame, and supporting wheels of a tool carrying frame carried thereby, a movable handle for steering both of said wheels, and means actuated by the movement of said handle to move said tool carrying frame.

4. In a cultivator, the combination with a main frame of two axles pivoted thereto, supporting wheels mounted on said axles, a tool carrying frame pivoted to said main frame, a handle pivotally mounted on said main frame, means connecting said handle to said axles, and means connecting said handle to said tool supporting frame whereby the movement of said handle in one direction will steer said wheels and the movement of said handle in a transverse direction will swing said tool carrying frame.

5. In a cultivator, the combination with a main frame of an axle pivoted thereto, a supporting wheel mounted on said axle, a tool carrying frame pivoted to said main frame to swing vertically, a handle mounted on said frame to swing laterally and upwardly, a sliding joint actuated by the lateral movement of said handle to swing said axle, and means actuated by the upward movement of said handle to swing said tool supporting frame.

6. In a cultivator, the combination with a main frame of a substantially L-shaped axle having an upwardly extending inner end, a supporting wheel carried by said axle, a crank arm connected to the upper end of said axle, a handle pivotally mounted upon said frame, and a sliding connection between said handle and the free end of said crank arm whereby said axle is caused to swing in response to the movement of said handle.

7. In a cultivator, the combination with a main frame of an axle carried thereby and mounted to swing upon an axis, a crank arm rigid with said axle, a bar pivoted to said frame, a sliding connection between the free end of said crank arm and the free end of said bar, a handle pivoted to said bar upon an axis transverse to the axis of said bar, a tool carrying frame mounted to swing upon said main frame and connecting means between said frame and said handle.

8. In a cultivator, the combination with a main frame of a pair of independent axles, supporting wheels carried thereby pivoted upon substantially vertical axes, a pair of independent tool carrying frames mounted to swing upon substantially horizontal axes upon opposite sides of said main frame, a pair of independently movable handles, sliding connections between one of said handles and said axles, means connecting the same handle to one of said tool carrying frames, and means connecting the other handle to the other tool carrying frame whereby the movement of the handles steers the cultivator and controls the vertical movement of the tool carrying frames.

9. In a cultivator, the combination with a main frame of a tool carrying frame upon each side thereof, and a draft element connected directly to the forward portions of each of said tool carrying frames and supported thereby and adjustable laterally with respect thereto.

10. In a cultivator, the combination with a main frame of a tool carrying frame extending longitudinally upon each side thereof, a draft element connected directly to the forward portion of each of said tool carrying frames and carried thereby, and means for vertically adjusting said draft elements with respect to said frames.

11. In a cultivator, the combination with a main frame of a pair of independent tool carrying frames arranged one upon each side of said main frame, and a pair of independent draft elements connected directly to the forward portion of each of said tool carrying frames respectively, and carried thereby and adjustable vertically and laterally thereon.

12. In a cultivator, the combination with a main frame of a pair of independent tool carrying frames arranged one upon each side of said main frame, a draft element directly connected to the forward portion of each of said tool carrying frames and carried thereby, and means for vertically adjusting said draft elements with respect to said tool carrying frames, said means comprising a vertical member provided with spaced apertures.

13. In a cultivator, a main frame comprising an arch member having a lateral extension upon each side thereof, a tongue secured to the top portion of said arch member, a brace extending between said tongue and the upper side portion of said arch member continuing downwardly and extending obliquely from the side portion of said arch member to the lateral extension thereof to brace said extension.

14. In a cultivator, a main frame, a tool carrying frame hinged thereto, a notched bar pivoted to one of said frames and engaging a portion of the other frame, a handle bar pivoted to said main frame, and a tie rod between said handle bar and said tool carrying frame.

15. In a cultivator, a main frame comprising an arch member, a lateral extension upon each side thereof, a yoke rigidly secured to the front side of each of said extensions, and a tool carrying frame pivotally carried by each yoke.

16. In a cultivator, a main frame, supporting wheels carried thereby, a tool frame pivotally carried by said main frame, and a draft element secured directly to said tool frame and carried thereby, and adjustable laterally with respect thereto.

17. In a cultivator, a longitudinally extending swinging tool carrying frame having a rearwardly extending tool carrying arm, and a draft element attached to and entirely supported by the forward end of said tool frame and adjustable laterally with respect thereto forward of the axis of said frame.

18. In a cultivator, a main frame comprising an arch member, a lateral extension upon each side thereof, a yoke secured to the front side of each of said extensions, the free ends of said yoke being provided with screw threaded bolt holes, the hole in one end being larger than the hole in the other end, a bolt having screw threaded portions corresponding in diameter to the threaded portions of said yoke, and a tool carrying frame pivotally carried by said bolt.

19. In a cultivator, a main frame comprising an arch member, a lateral extension upon each side thereof, a yoke secured to the front side of each of said extensions, the free ends of said yoke being provided with screw threaded bolt holes, the hole in one end being larger than the hole in the other end, a bolt having screw threaded portions corresponding in diameter to the threaded portions of said yoke, a tool carrying frame pivotally carried by said bolt and slidable longitudinally thereof between the side of said yoke, and means for adjusting said frame upon said bolt.

20. In a cultivator, a main frame comprising an arch member, a lateral extension upon each side thereof, a pivoted axle and a wheel carried by each extension, a transverse steering bar pivoted centrally to the upper central portion of said arch member, a handle bar fixed laterally with respect to said transverse bar, and sliding connections between said transverse steering bar and the said axles.

21. In a cultivator, a main frame comprising an arch member, a lateral extension upon each side thereof, a pivoted axle and a wheel carried by each extension, a transverse steering bar pivoted centrally to the upper central portion and in the rear of said arch member, a handle bar fixed laterally with respect to said transverse bar, longitudinally sliding connections btween said transverse steering bar and the said axles, and means to lock said steering bar in a fixed position.

22. In a cultivator, the combination with a main frame, of a tool carrying frame pivoted thereto, a handle bar pivoted to said main frame, a gravity catch between said handle bar and said tool frame to swing the same, a second tool carrying frame pivoted to said main frame, a handle bar rigid with said second tool carrying frame and a gravity catch between said main frame and said second tool frame.

23. In a cultivator, a main frame comprising an arch member, a lateral extension upon each side thereof, a pivoted axle and a wheel carried by each extension, a transverse steering bar pivoted centrally to the upper central portion of said arch member, a handle bar fixed laterally with respect to said transverse bar, sliding connections between said steering bar and said axles, a tool carrying frame pivoted to said main frame, a notched pawl between said frames, and a tie rod between said handle bar and said tool carrying frame, said handle bar being pivoted to said steering bar to swing vertically.

24. In a cultivator, a main frame, an axle pivoted thereto, a wheel carried by said axle, a transverse steering bar pivoted to said frame, a handle bar fixed laterally with respect to said transverse bar, a sliding connection between said steering bar and said axle, a tool carrying frame hinged to said main frame, said handle being pivoted to swing vertically, and means between said handle and said tool carrying frame for swinging said frame by the vertical motion of said handle.

25. In a cultivator, a main frame, an axle pivoted thereto, a wheel carried by said axle, a transverse steering bar pivoted to said frame, a handle bar fixed laterally with respect to said transverse bar, a sliding connection between said steering bar and said axle, a tool carrying frame hinged to said main frame, said handle being pivoted to swing vertically, means between said handle and said tool carrying frame for raising said frame by the upward motion of said handle, a second tool carrying frame hinged to said main frame, a second handle bar rigidly secured to said second frame.

26. In a cultivator a main frame, a tool carrying frame pivoted thereto, a handle bar pivoted to said main frame, means between said handle bar and said tool frame to swing the same, a second tool carrying frame pivoted to said main frame, and a handle bar rigid with said second tool carrying frame.

27. In a cultivator, the combination with a main frame, of a tool carrying frame pivoted thereto, a handle bar pivoted to said main frame, and means connecting said frames said means being detachably connected to one of said frames, and being held in engagement therewith by gravity only and thrown into and out of engagement therewith by the movement of said handle bar.

28. In a cultivator the combination with a main frame, of a tool carrying frame pivoted thereto and means connecting said frames to limit the downward movement of said tool carrying frame, said means being detachably connected to one of said frames and being held in engagement therewith by gravity only and being thrown out of engagement therewith by the vertical movement of said tool carrying frame.

29. In a cultivator, the combination with a main frame, of a tool carrying frame pivoted thereto, and a bar, provided with a notch, pivotally connected to one of said frames and adapted to engage the other of said frames in said notch and to be held in engagement therewith by gravity only, and to be thrown into and out of engagement with said last mentioned frame by means of the vertical movement of said tool carrying frame.

30. In a cultivator, the combination with a main frame, of a tool carrying frame pivoted thereto, a bar pivotally connected to said main frame and provided with a notch adapted to engage a portion of said tool carrying frame and to be held in position by gravity only to limit the downward motion of said frame, the upper edge of said notch being inclined upwardly and outwardly with respect to said tool carrying frame whereby said frame may be disengaged from said notch by the upward motion of said frame.

31. In a cultivator, a main frame, a tool carrying frame hinged thereto, and a notched bar or pawl pivoted to one of said frames and engaging a portion of the other frame and held in position by gravity only.

32. In a cultivator, the combination with a main frame, of a tool carrying frame pivoted thereto, a handle bar mounted upon said tool carrying frame, and means connecting said frames and thrown into and out of engagement by the movement of said handle bar.

33. In a cultivator, the combination with two relatively movable parts, of a bar provided with a notch pivotally secured to one of said parts and engaging a portion of the other of said parts in said notch, said bar being normally held against said portion by gravity only, and said notch being inclined upon one side whereby the movement of said engaged part toward said side will disengage said part from said notch.

34. In a cultivator, the combination with two relatively movable parts, of a bar provided with a notch pivotally secured to one of said parts and engaging a portion of the other of said parts in said notch, said bar being normally held against said portion by gravity only, said notch being inclined upon one side whereby the movement of said engaged portion toward said side will disengage said portion from said notch, the edge of the bar upon the opposite side of said notch being turned inwardly, whereby a quick motion of the said movable engaged portion will cause said portion to pass over said notch without engaging therewith, but a slow movement of the said portion over the said notch will bring the said portion into engagement therewith 35. In a cultivator, the combination with a main frame, of a tool carrying frame mounted to oscillate thereon, and a gravity catch pivoted upon an axis fixed with respect to said main frame to limit the downward motion of said tool carrying frame.

36. In a cultivator, the combination with a main frame, of a tool carrying frame mounted to oscillate thereon, and a gravity catch to limit the motion of said tool carrying frame in a downward direction, said tool carrying frame being free to move in the opposite direction from the limit of said motion.

37. In a cultivator, the combination with a main frame, of a tool carrying frame pivoted thereto, a bar pivoted to said main frame and having notches arranged to engage with said tool carrying frame to hold said tool carrying frame against downward movement in predetermined positions, said tool carrying frame being freely movable upwardly on its pivot.

38. In a cultivator, the combination with a main frame, of a tool carrying frame pivoted thereto, a bar pivoted to said main frame and extending downwardly and rearwardly therefrom, and having a notch in the lower edge thereof adapted to engage a portion of said tool carrying frame.

39. In a cultivator, the combination with a main frame, of a tool carrying frame pivoted thereto, a bar pivoted to said main frame and extending downwardly and rearwardly therefrom having a notch in the lower edge thereof adapted to engage a portion of said tool carrying frame, and means to lift said tool carrying frame to disengage said frame from said notch.

40. In a cultivator, the combination with a main frame, of a tool carrying frame mounted to oscillate upon a fixed axis thereon and a gravity catch to limit the downward movement of the free end of said tool carrying frame, said free end being freely movable upwardly from the downward limit.

41. In a cultivator, the combination with a main frame, of a rigid tool carrying frame mounted to oscillate with respect thereto upon a fixed axis, a draft element connected to said tool frame and entirely supported thereby, and means to adjust said draft element vertically with respect to said frame.

42. In a cultivator, the combination with a main frame, of a rigid tool carrying frame mounted to oscillate with respect thereto upon a fixed axis, a draft element connected to said tool frame and entirely supported thereby, and means to adjust said draft element laterally with respect to said frame.

43. In a cultivator, the combination with a main frame, of a rigid tool carrying frame mounted to oscillate with respect thereto upon a fixed axis, a draft element connected to said tool frame and entirely supported thereby, and means to adjust said draft element laterally and vertically with respect to said frame.

44. In a cultivator, the combination with a main frame, a supporting wheel carried thereby, a tool frame mounted upon the inner side of said wheel to oscillate upon said main frame and having a bar extending outwardly from the forward end thereof in front of and substantially in alinement with said wheel for the attachment of a draft element.

45. In a cultivator, the combination with a main frame, a supporting wheel carried thereby, a tool frame mounted to oscillate upon said main frame upon the inner side of said wheel and having a bar extending outwardly from the forward end thereof and rigid therewith in front of said wheel and across the path thereof for the attachment of a draft element.

46. In a cultivator, the combination with a main frame, of a supporting wheel on each side thereof, a tool carrying frame carried by said main frame within and adjacent to each of said wheels, and a laterally and outwardly extending projection upon the forward end of each of said frames for the attachment of draft elements, each of said projections being substantially in front of and in alinement with one of said wheels.

In witness whereof, I have hereunto set my hand this 21st day of December A. D. 1907.

SAMUEL L. ALLEN.

Witnesses:
   A. I. GARDNER,
   ALEXANDER PARK.